United States Patent
Ito

(10) Patent No.: US 10,701,225 B2
(45) Date of Patent: Jun. 30, 2020

(54) USER INTERFACE DEFINITION FOR INFORMATION PROCESSING APPARATUS, CONTROL METHOD, AND STORAGE MEDIUM

(71) Applicant: CANON KABUSHIKI KAISHA, Tokyo (JP)

(72) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 15/222,737

(22) Filed: Jul. 28, 2016

(65) Prior Publication Data
US 2017/0034372 A1 Feb. 2, 2017

(30) Foreign Application Priority Data
Jul. 31, 2015 (JP) ................................. 2015-151823

(51) Int. Cl.
*H04N 1/00* (2006.01)
(52) U.S. Cl.
CPC ..... *H04N 1/00506* (2013.01); *H04N 1/00204* (2013.01); *H04N 1/00464* (2013.01); *H04N 1/00949* (2013.01); *H04N 2201/0094* (2013.01)
(58) Field of Classification Search
CPC ........... H04N 1/00506; H04N 1/00464; H04N 1/00949; H04N 1/00204; H04N 2201/0094
See application file for complete search history.

(56) References Cited

U.S. PATENT DOCUMENTS

| 8,416,255 B1* | 4/2013 | Gilra ....................... G01J 3/526 345/593 |
| 2004/0205473 A1* | 10/2004 | Fisher ..................... G06F 21/41 715/255 |
| 2009/0019386 A1* | 1/2009 | Sweetland ............ G06F 17/248 715/765 |
| 2009/0282417 A1* | 11/2009 | Yoshida ................. G06Q 10/10 718/104 |
| 2009/0292723 A1* | 11/2009 | Levin ................. H04M 1/72544 |
| 2013/0057566 A1* | 3/2013 | Kriese ...................... G09G 5/02 345/589 |
| 2013/0219307 A1* | 8/2013 | Raber ................... G06F 3/0484 715/763 |

(Continued)

FOREIGN PATENT DOCUMENTS

| JP | 2005-293407 A | 10/2005 |
| JP | 4039439 B2 | 1/2008 |

(Continued)

*Primary Examiner* — Daniel W Parcher
(74) *Attorney, Agent, or Firm* — Canon U.S.A., Inc. IP Division

(57) ABSTRACT

In a multifunction peripheral (MFP), an information processing apparatus includes an execution unit configured to execute a series of processing operations of the MFP including a plurality of processes by combining a plurality of extension programs according to a definition file that defines the series of processing operations, and a determination unit configured to determine a design of a user interface that is used in common by the plurality of extension programs executing the respective processes of the series of processing operations, wherein the plurality of extension programs has respective designs of user interfaces.

5 Claims, 10 Drawing Sheets

423
FUNCTION PROVIDER INFORMATION TABLE

| No. | FUNCTION PROVIDER ID | NAME | FUNCTION TYPE | FUNCTION PROVIDER INTERFACE | DEFAULT COLOR |
|---|---|---|---|---|---|
| 1 | NORMAL_SCAN | NORMAL SCAN | SCAN | IScanProvider | Green |
| 2 | EASY_SCAN | EASY SCAN | SCAN | IScanProvider | Blue |
| 3 | OCR_DEVICE | EMBEDDED OCR | OCR | IOcrProvider | Gray |
| 4 | OCR_WEB | WEB OCR | OCR | IOcrProvider | — |
| 5 | SEND_FTP | FTP SENDING | SEND_FILE | ISendFileProvider | Gray |
| ... | ... | ... | ... | ... | ... |

(56) References Cited

U.S. PATENT DOCUMENTS

2015/0149939 A1\* 5/2015 Mayblum ......... H04M 1/72544
  715/765
2015/0365543 A1\* 12/2015 Iwata ................. H04N 1/00129
  358/1.13

FOREIGN PATENT DOCUMENTS

| JP | 2014-134872 A | 7/2014 |
| JP | 2014-229094 A | 12/2014 |

\* cited by examiner

FIG.5

FUNCTION PROVIDER INFORMATION TABLE 423

| No. | FUNCTION PROVIDER ID | NAME | FUNCTION TYPE | FUNCTION PROVIDER INTERFACE | DEFAULT COLOR |
|---|---|---|---|---|---|
| 1 | NORMAL_SCAN | NORMAL SCAN | SCAN | IScanProvider | Green |
| 2 | EASY_SCAN | EASY SCAN | SCAN | IScanProvider | Blue |
| 3 | OCR_DEVICE | EMBEDDED OCR | OCR | IOcrProvider | Gray |
| 4 | OCR_WEB | WEB OCR | OCR | IOcrProvider | — |
| 5 | SEND_FTP | FTP SENDING | SEND_FILE | ISendFileProvider | Gray |
| ... | ... | ... | ... | ... | ... |

WORKFLOW DEFINITION FILE

```
601  <Workflow id="..." name="PERFORM SCANNING, OCR, AND FTP SENDING" color="Blue">
602    <FP no="1" type="SCAN">
603      <Condition>...
         </Condition>
604      <Action no="1" method="showSettingUI">...
         </Action>
605      <Action no="2" method="doScan">
             <Parameter>...
             </Parameter>
             <Output type="Document" id="foo" />
         </Action>
       </FP>

606    <FP no="2" type="OCR">
         <Condition>...
         </Condition>
         <Action no="1" method="showSettingUI">...
         </Action>
         <Action no="2" method="doOCR">
             <Input type="Document" src="foo" />
             < Parameter>...
             </Parameter>
             <Output type="String" id="bar" />
         </Action>
       </FP>

607    <FP no="3" id="SEND_FTP" >
         <Action no="1" method="showSettingUI">...
         </Action>
         <Action no="2" method="doSend">
             <Input type="Document" src="foo" />
             <Input type="String" src="bar" />
             <Parameter>...
             </Parameter>
         </Action>
       </FP>
     </Workflow>
```

FIG.7

441
WORKFLOW DEFINITION FILE

```
701 — <Workflow id="..." name="PERFORM EASY SCANNING, OCR, AND FTP SENDING">
702 —    <FP no="1" id="EASY_SCAN">...
         </FP>

<FP no="2" type="OCR">...
         </FP>

<FP no="3" id="SEND_FTP" >...
         </FP>
     </Workflow>
```

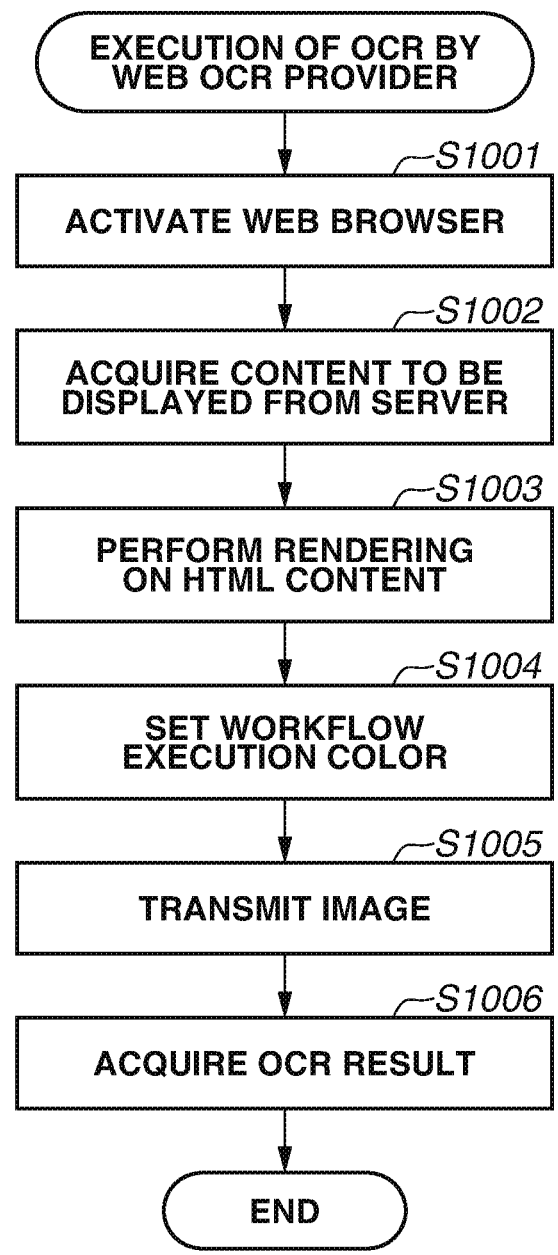

USER INTERFACE DEFINITION FOR INFORMATION PROCESSING APPARATUS, CONTROL METHOD, AND STORAGE MEDIUM

BACKGROUND OF THE INVENTION

Field of the Invention

Aspects of the present invention relate to an information processing apparatus, a control method for an information processing apparatus, and a storage medium.

Description of the Related Art

In recent years, in image forming apparatuses suited to be installed in offices, a system capable of extending the functions of each image forming apparatus has been in widespread use. A function that is added by extending the functions of an image forming apparatus (hereinafter referred to as an "extension function") is implemented by a software program (hereinafter referred to as "extension software"), and can be added not only at the time of factory shipment but also at the operation phase, after installation of the image forming apparatus at its operating premises. Such a system includes, for example, Multifunctional Embedded Application Platform (MEAP™) developed by Canon Inc.

Furthermore, there is known a technique to enable extending the functions of an image forming apparatus by downloading extension software selected by the user from an external server and installing the downloaded extension software on the image forming apparatus (as discussed in Japanese Patent No. 4039439).

In particular, extension software created to perform processing from specific input to output for a certain purpose is called "application software" (hereinafter referred to as an "application"). An application implements a series of processing operations from input to output (hereinafter referred to as a "workflow") by using functions, such as facsimile, scanning, and printing, included in an image forming apparatus. The image forming apparatus is configured to allow a plurality of applications to be installed thereon according to a user's purpose.

In a case where a workflow is implemented by a single application as mentioned above, it is desirable that a graphical user interface (GUI) that the user uses be matched in the design including elements, such as base colors, shapes of, for example, buttons, layouts, and font types to standards or norms generally used in the related industry.

Moreover, there is also known a technique in which input, conversion, and output are implemented by the respective independent pieces of extension software, a series of processing operations is performed by a combination of such pieces of extension software, and billing is carried out by a combination of the pieces of extension software and parameters (as discussed in Japanese Patent Application Laid-Open No. 2014-134872).

However, in a case where a workflow is implemented by freely combining the respective single functions of a plurality of pieces of extension software, the pieces of extension software, which implement the respective processes of the workflow, have respective particular designs for GUIs. Therefore, from the viewpoint of the user, GUI designs for the respective processes of the workflow to not necessarily match. Therefore, the GUIs implemented by disperse processes of workflow may be confusing and difficult to operate for the user, and indeed may result in low operability of the image forming apparatuses.

SUMMARY OF THE INVENTION

Aspects of the present invention are directed to providing a scheme of, even in a case where a series of processing operations is performed by combining a plurality of extension programs where the designs of user interfaces are not similar, making the designs of the graphic user interfaces more compatible with each other in the series of processing operations.

According to an aspect of the present invention, an information processing apparatus includes an execution unit configured to execute a series of processing operations including a plurality of processes by combining a plurality of extension programs according to a definition file that defines the series of processing operations, and a determination unit configured to determine a design of a user interface that is used in common by the plurality of extension programs executing the respective processes of the series of processing operations, wherein the plurality of extension programs has respective designs of user interfaces.

Further features of the present invention will become apparent from the following description of exemplary embodiments with reference to the attached drawings.

BRIEF DESCRIPTION OF THE DRAWINGS

FIG. 5 illustrates a function provider information table according to the exemplary embodiment.

FIG. 6 illustrates an example of a workflow definition file according to the exemplary embodiment.

FIG. 7 illustrates another example of the workflow definition file according to the exemplary embodiment.

FIG. 10 is a flowchart illustrating an example of optical character recognition (OCR) execution processing performed by a web OCR provider according to the exemplary embodiment.

DESCRIPTION OF THE EMBODIMENTS

Various exemplary embodiments, features, and aspects of the invention will be described in detail below with reference to the drawings.

Figure 1:
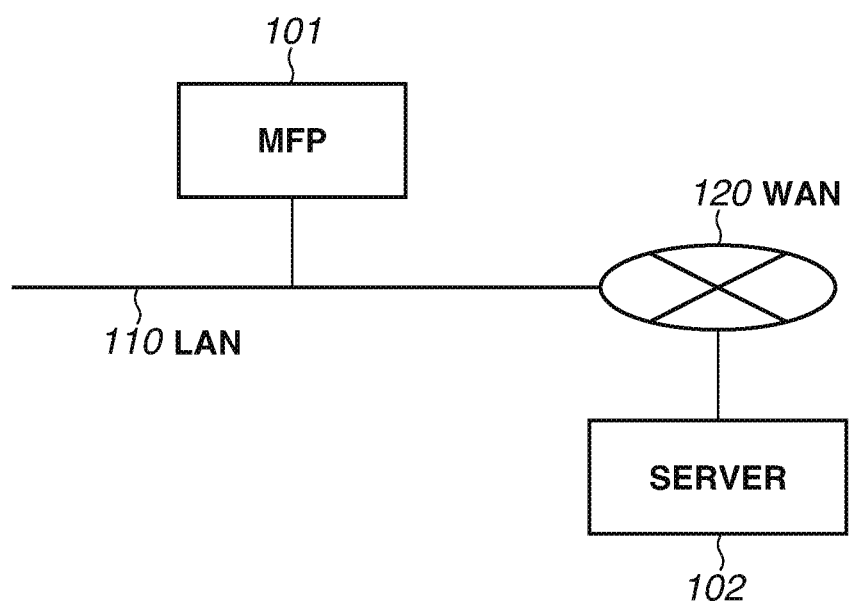
FIG. 1 illustrates a configuration of a network system including a multifunction peripheral (MFP) apparatus according to an exemplary embodiment.

FIG. 1 illustrates an example of a configuration of a system to which an image processing apparatus serving as an information processing apparatus according to an exemplary embodiment of the present invention is applicable.

The system according to the present exemplary embodiment includes a multifunction peripheral (MFP) apparatus 101, which is connected via a local area network (LAN) 110 and a wide area network (WAN) 120 to a server 102. Apparatuses on the LAN 110 and apparatuses on the WAN 120 are able to communicate with each other via the respective networks. Furthermore, FIG. 1 illustrates an example of a typical network configuration, and each of the MFP 101 and the server 102 can be located on either the LAN 110 or the WAN 120.

The MFP 101 is an image processing apparatus including, for example, a scanner and a printer. In addition, the MFP 101 has a software platform used to add or execute extension software, which runs on the apparatus. The MFP 101 is also an information processing apparatus that allows a function to be added thereto or a function thereof to be extended by extension software (also referred to as an "extension program").

The server 102 is a server that performs various processing operations in cooperation with the MFP 101. For example, the server 102 can be a file server that receives image data from the MFP 101 or can be a web application server that performs optical character recognition (OCR) processing, image processing, or other processing in response to a processing request from the MFP 101. The server 102 is not limited to a single server, but can include a plurality of servers depending on the purpose. Furthermore, the processing operations performed by the server 102 are not limited to the above-mentioned processing operations, but can be any other processing operations.

Figure 2:
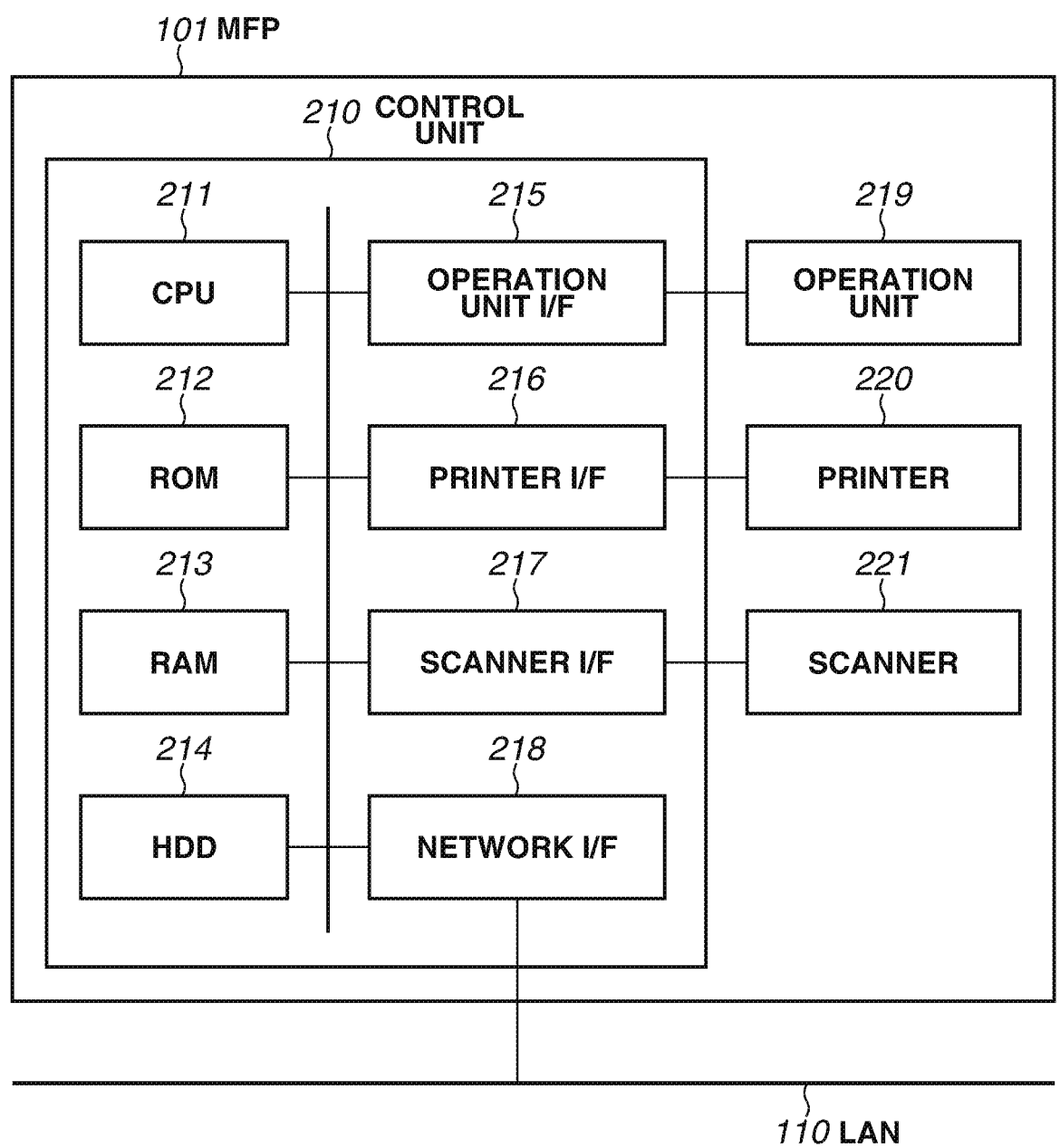
FIG. 2 illustrates a hardware configuration of a multifunction peripheral (MFP) according to the exemplary embodiment.

FIG. 2 is a block diagram illustrating an example of a hardware configuration of the MFP 101.

A control unit 210, which includes a central processing unit (CPU) 211 implemented by one or more microprocessors, controls the operation of the entire MFP 101.

The CPU 211 reads out control programs stored in a read-only memory (ROM) 212 and a hard disk drive (HDD) 214 and performs various control processing operations, such as reading control and transmission control. The ROM 212 stores various programs and various pieces of data. A random access memory (RAM) 213 is used as a temporary storage region, such as a main memory or a work area, for the CPU 211. The HDD 214 stores image data and various programs, which include installed extension software. Furthermore, another storage device, such as a solid state drive (SSD), can be provided instead of or in addition to the HDD 214.

An operation unit interface (I/F) 215 connects an operation unit 219 to the control unit 210. The operation unit 219 includes, for example, a liquid crystal display unit having a touch panel function and a keyboard.

A printer I/F 216 connects a printer 220 to the control unit 210. Image data to be printed by the printer 220 is transferred from the control unit 210 to the printer 220 via the printer I/F 216, and is then printed on a recording medium by the printer 220.

A scanner I/F 217 connects a scanner 221 to the control unit 210. The scanner 221 reads an image on a document to generate image data and inputs the image data to the control unit 210 via the scanner I/F 217.

A network I/F 218 connects the control unit 210 (the MFP 101) to the LAN 110. The network I/F 218 transmits and receives various pieces of information between the MFP 101 and another apparatus on the LAN 110 or the WAN 120.

Figure 3:
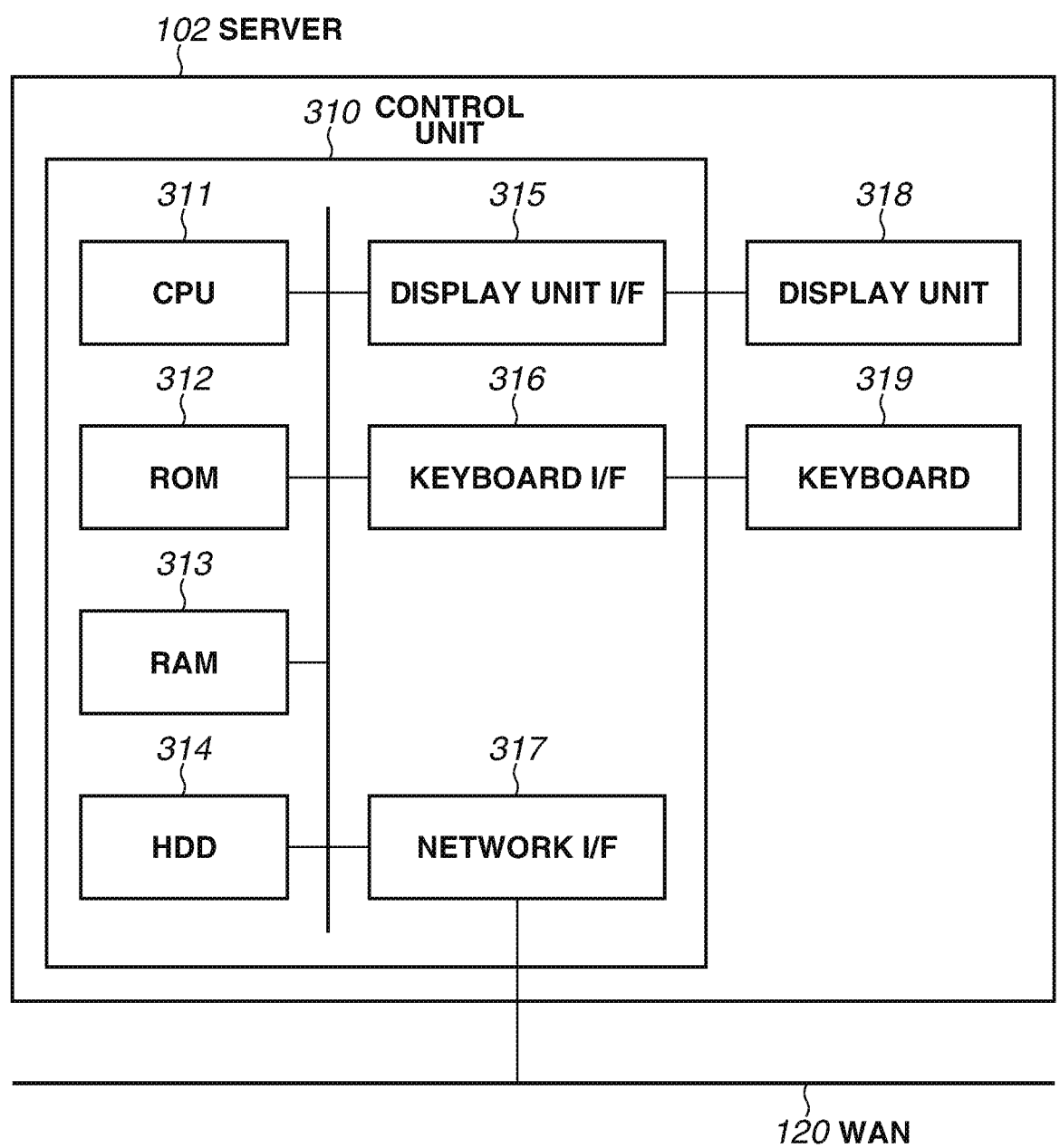
FIG. 3 illustrates a hardware configuration of a server according to the exemplary embodiment.

FIG. 3 is a block diagram illustrating an example of a hardware configuration of the server 102.

A control unit 310, which includes a CPU 311, controls the operation of the entire server 102. The CPU 311 reads out control programs stored in a ROM 312 and an HDD 314 and performs various control processing operations. The ROM 312 stores various programs and various pieces of data. A RAM 313 is used as a temporary storage region, such as a main memory or a work area, for the CPU 311. The HDD 314 stores various programs and various pieces of data.

A display unit I/F 315 connects a display unit 318 to the control unit 310. A keyboard I/F 316 connects a keyboard 319 to the control unit 310. The CPU 311 recognizes an instruction issued by the user via the keyboard 319 and causes the display unit 318 to shift a displayed screen according to the recognized instruction.

A network I/F 317 connects the control unit 310 (the server 102) to the WAN 120. The network I/F 317 transmits and receives various pieces of information between the server 102 and another apparatus on the LAN 110 or the WAN 120.

Figure 4:
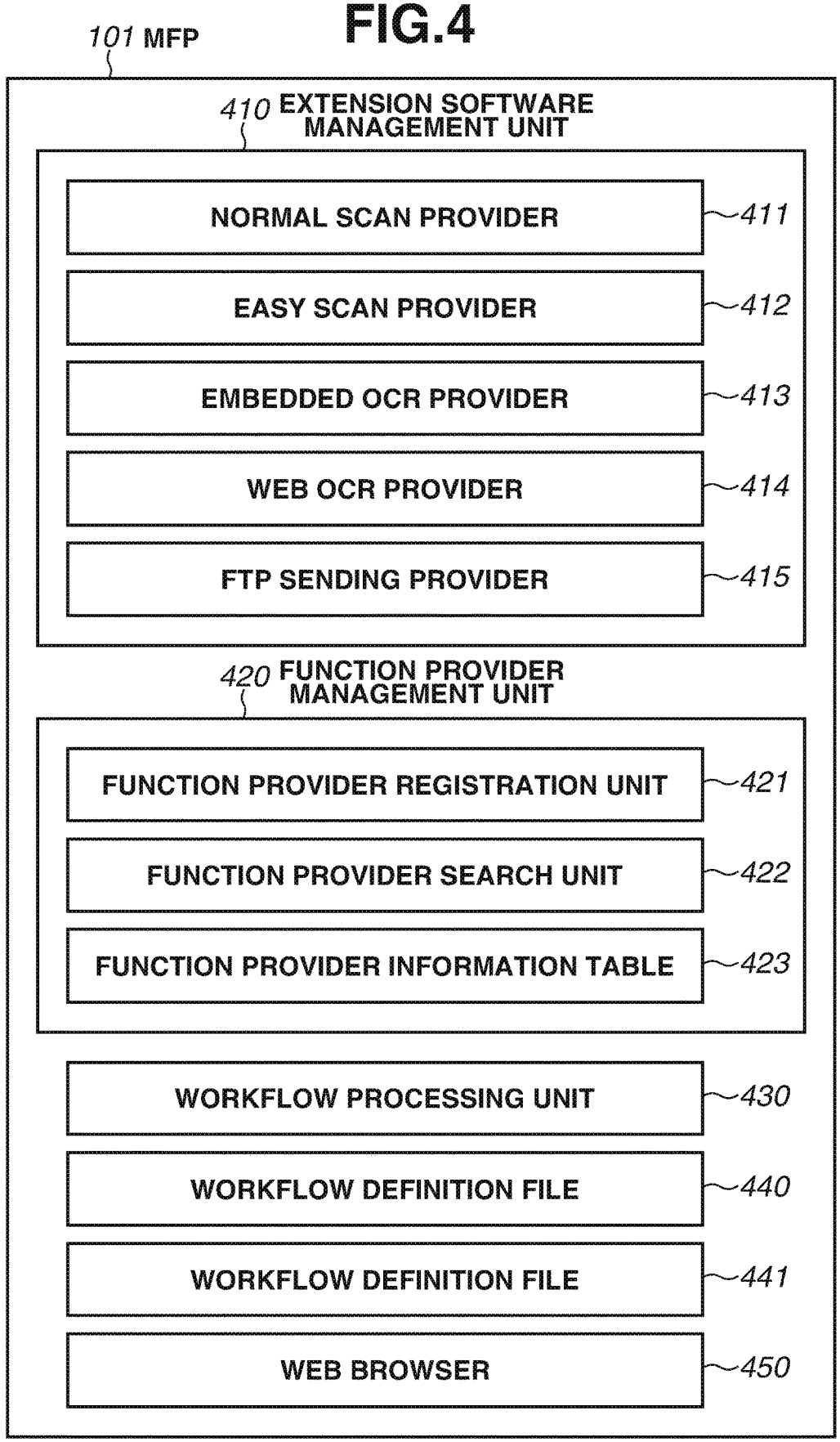
FIG. 4 illustrates a software configuration of the MFP according to the exemplary embodiment.

FIG. 4 illustrates an example of a software configuration of the MFP 101 according to the present exemplary embodiment. Each unit illustrated in FIG. 4 is a functional unit that is implemented by the CPU 211 reading out, to the RAM 213, a program (software) stored in the ROM 212 or the HDD 214 of the MFP 101 as appropriate and analyzing and executing the program.

An extension software management unit 410 is a software platform used to allow extension software to run on the MFP 101. Referring to FIG. 4, five pieces of extension software 411 to 415 are installed as function providers on the MFP 101.

Each function provider is a type of extension software, but is not an application. The application alone includes a complete series of processing operations from input to output. On the other hand, a single function provider represents extension software that provides a specific function, such as input alone or output alone. Therefore, to perform a complete series of processing operations from input to output using function providers, it is necessary to combine a plurality of function providers.

For example, to provide a user with a function to "perform scanning, perform preview, and then perform transmission", with regard to applications, a single application can implement three functions of "scanning", "preview", and "transmission". On the other hand, with regard to function providers, three function providers, i.e., "a function provider that implements a scanning function", "a function provider that implements a preview function", and "a function provider that implements a transmission function" are required. Moreover, to execute such three function providers as a series of processing operations, a workflow processing unit 430 and a workflow definition file 440, which are described later below, are required.

Furthermore, the application registers the application itself with a menu screen that is used to invoke functions originally included in the MFP 101 (for example, copy function and facsimile transmission function), in such a way that the application is displayed while being juxtaposed to the original functions. The application is invoked in response to an instruction issued by the user via the menu screen. On the other hand, the function provider registers the function provider itself not with the menu screen but with a function provider management unit 420, which is described later below. The function provider is invoked in response to an instruction of the workflow processing unit 430 via the function provider management unit 420. Moreover, to execute a workflow, a menu item is used which is displayed on the menu screen by the workflow processing unit 430 based on the workflow definition file 440.

Furthermore, the function provider is programmed in such a way as to satisfy a rule prescribed by the function provider management unit 420 (hereinafter referred to as a "function provider interface"). The function provider interface is a software interface according to which a rule for performing communication between pieces of software is determined. The function provider interface is prescribed for each type of function provided by the function provider (hereinafter referred to as a "function type"). The function provider is invoked by the workflow processing unit 430 based on the function provider interface.

Moreover, a single function provider can have a plurality of types of interfaces depending on the purpose. For example, a function provider for implementing a scanning function can be provided with a plurality of types of interfaces used for respective purposes, such as an interface used for the purpose of "displaying a scan setting screen" and an interface used for the purpose of "executing a scan job".

Additionally, a plurality of types of function providers can be installed on the MFP 101. A plurality of types of function providers having respective different function types can be installed or a plurality of types of function providers having the same function type can be installed. Since the function providers having the same function type have the same function provider interface, extension software serving as the function provider having the same function type is able to perform communication between pieces of software in the same way.

Each of a normal scan provider 411 and an easy scan provider 412 is a function provider that provides a scanning function (function type=scan). Function providers the function type of which is "scan" are collectively referred to as a "scan provider". The scan provider implements a function provider interface defined for function providers the function type of which is "scan" (a scan provider interface).

The normal scan provider 411 has a scan setting screen aimed at average users. On the other hand, the easy scan provider 412 has a scan setting screen aimed at beginners unaccustomed to operating the MFP 101.

Each of an embedded optical character recognition (OCR) provider 413 and a web OCR provider 414 is a function provider that provides an OCR function (function type=OCR). Function providers the function type of which is "OCR" are collectively referred to as an "OCR provider". The OCR provider implements a function provider interface defined for function providers the function type of which is "OCR" (an OCR provider interface). The embedded OCR provider 413 provides an OCR function by performing character recognition processing at the MFP 101. On the other hand, the web OCR provider 414 provides an OCR function by invoking, via a web browser 450, character recognition processing that an external web server (for example, the server 102) provides.

A file transfer protocol (FTP) sending provider 415 is a function provider that provides an FTP sending function (function type=file sending). Function providers the function type of which is "file sending" are collectively referred to as an "FTP sending provider". The FTP sending provider implements a function provider interface defined for function providers the function type of which is "file sending" (a file sending provider interface).

Each function provider implements a function provider interface defined for the function type of the function provider itself even if there is no other function provider having the same function type in the MFP 101.

The above-described five function providers 411 to 415 are merely examples, and various function providers can be added to or deleted from the MFP 101 as extension software.

The function provider management unit 420 is software that manages the function providers installed on the MFP 101. The function provider management unit 420 includes a function provider registration unit 421, a function provider search unit 422, and a function provider information table 423.

The function provider registration unit 421 registers, in response to a request from each function provider, information, such as the function type and settable values, about the function provider with the function provider information table 423. Each function provider requests the function provider registration unit 421 to register the function provider itself when the function provider has become ready to be executed after being installed on the MFP 101.

The function provider search unit 422 receives a search condition for a function provider from the workflow processing unit 430, which is described later below, and identifies a function provider that matches the search condition based on the information registered with the function provider information table 423. In a case where there is a plurality of function providers that match the search condition, to identify a single function provider as a search result, the function provider search unit 422 sets, as the search result, a function provider having the highest priority. In the present exemplary embodiment, although not described in detail, priorities for respective function provider types can be set in the function provider information table 423, which is illustrated in FIG. 5. Furthermore, a table can be separately provided in which priorities of function providers for respective function provider types are set.

The workflow processing unit 430 executes a plurality of processes as a series of processing operations by combining a plurality of function providers according to workflow definition files 440 and 441, which are described later below. In the present exemplary embodiment, the workflow represents a series of processing operations including a plurality of processes implemented by combining a plurality of function providers.

The workflow definition file 440 defines information about invocation of a function provider, such as a search condition for a function provider to be invoked by the workflow processing unit 430, the order of invocation, and setting values applicable to the invoked function provider. The workflow definition file 441 differs in definition content from the workflow definition file 440. Furthermore, although, in FIG. 4, two examples of workflow definition files are defined, the number of workflow definition files is not limiting, and one or three or more workflow definition files can exist on the MFP 101. Details of the workflow definition files 440 and 441 are described later below with reference to FIGS. 6 and 7.

FIG. 5 illustrates an example of the function provider information table 423.

As illustrated in FIG. 5, the function provider information table 423 retains information about function providers, including a function provider identifier (ID) for uniquely identifying a function provider, the name of the function provider, the function type, the function provider interface, and a default color.

The default color indicates the theme of a color of a GUI design of the function provider in a case where there is no specific instruction. The default color being "Green" indicates performing GUI display in colors with green used as a base color. Although, in the present exemplary embodiment, the color used as a base color is expressed as "Green", "Blue", or "Gray", it can be expressed by other color values, such as RGB values.

FIG. 6 illustrates an example of a specific description of the workflow definition file 440 according to the present exemplary embodiment. Although, in the present exemplary embodiment, the workflow definition file 440 is expressed as a file of the Extensible Markup Language (XML) format, it is not limited to a file of the XML format but can be a file of another format.

A Workflow tag 601 indicates that the following description is the definition of a workflow. The attribute value "color="Blue"" of the Workflow tag 601 indicates that during execution of the workflow, the workflow is carried out with a design with green used as a base color.

An FP tag 602, which is a child element of the Workflow tag 601, defines information about a function provider to be executed in the workflow. The attribute "no" of the FP tag 602 defines the order of execution of function providers in the workflow, and the value "no="1"" indicates that the function provider concerned is to be first executed. The attribute "type" of the FP tag 602 defines the function type of the function provider to be executed, and the value "type="SCAN"" indicates the function type is a scan provider.

A Condition tag 603, which is a child element of the FP tag 602, defines a search condition for the scan provider.

An Action tag 604, which is a child element of the FP tag 602, defines information about invocation of the function provider. The attribute "no" and attribute "method" of the Action tag 604 respectively define the order of execution in the function provider defined by the FP tag 602 and an interface to be invoked. The Action tag 604 defines that, in executing the scan provider, the interface "showSettingUI" is to be first invoked.

An Action tag 605, which is a child element of the FP tag 602, defines that, in executing the scan provider, the interface "doScan" is to be second invoked. The Action tag 605 contains a Parameter tag, which is set to invoke the interface "doScan", and an Output tag, which defines the output of a result of execution of the interface "doScan".

The attribute "no" and attribute "type" of an FP tag 606 define that the function provider to be second executed is an OCR provider. Child elements of the FP tag 606 are configured in a similar way to that in the FP tag 602.

The attribute "no" and attribute "id" of an FP tag 607 define that the function provider to be third executed is an FTP sending provider.

Furthermore, in FP tags, each function provider can be specified by the function type using the attribute "type" as in the FP tags 602 and 606, or can be uniquely specified using the attribute "id" as in the FP tag 607.

FIG. 7 illustrates another example of a specific description of the workflow definition file 441 according to the present exemplary embodiment.

A Workflow tag 701 indicates that the following description is the definition of a workflow. Unlike the Workflow tag 601 illustrated in FIG. 6, the Workflow tag 701 indicates that the attribute "color" is not defined in the workflow.

The attribute "no" and attribute "id" of an FP tag 702 define that the function provider to be first executed is an easy scan provider. The description of subsequent other tags is similar to that of the corresponding tags illustrated in FIG. 6, and is, therefore, not repeated.

Figure 8:
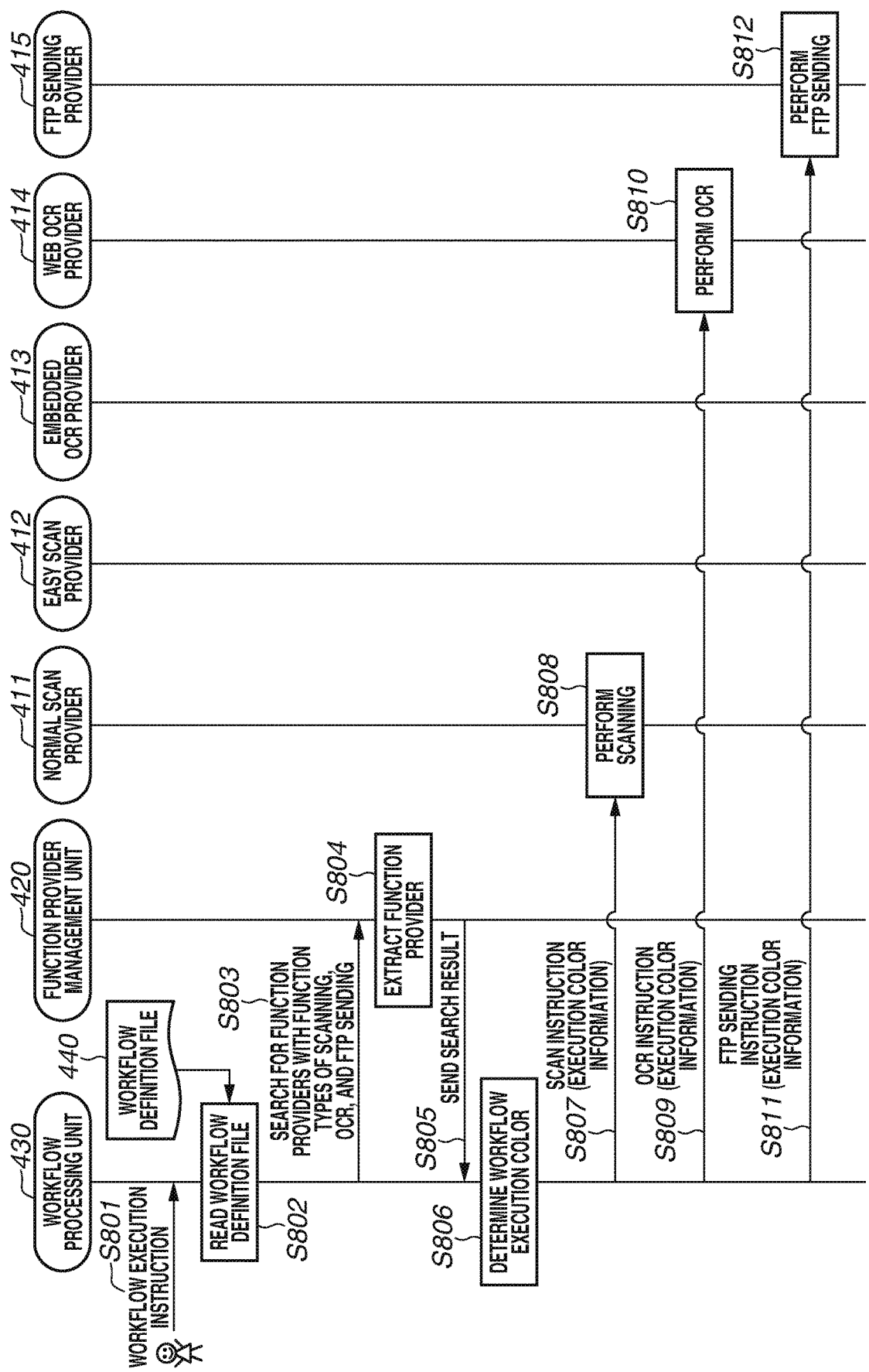
FIG. 8 is a sequence diagram illustrating an example of workflow execution processing according to the exemplary embodiment.

FIG. 8 is a sequence diagram illustrating the flow of a series of processing operations in workflow execution processing performed by the MFP 101. Each processing operation illustrated in FIG. 8 and FIGS. 9 and 10, which are described later below, is performed by each function implemented by the CPU 211 reading out a program (software) stored in the ROM 212 or the HDD 214 of the MFP 101 to the RAM 213 as appropriate and analyzing and executing the program.

In step S801, the workflow processing unit 430 receives a workflow execution instruction from the user. In response to receipt of the workflow execution instruction, the workflow processing unit 430 performs processing in step S802.

In step S802, the workflow processing unit 430 reads a workflow definition file 440 corresponding to the execution instruction received in step S801.

Then, in step S803, the workflow processing unit 430 instructs the function provider management unit 420 to search for function providers described in the workflow definition file 440. Since a "function provider the function type of which is scan", a "function provider the function type of which is OCR", and a "function provider the function type of which is SEND_FTP" are described in the workflow definition file 440, the workflow processing unit 430 specifies a search condition for the three function providers and instructs the function provider management unit 420 to perform a search with the specified search condition. In response to an instruction for the search, the function provider management unit 420 performs processing in step S804.

In step S804, the function provider management unit 420 extracts a function provider that matches the search condition based on the function provider information table 423. In a case where there is more than one function provider that matches the search condition, the function provider management unit 420 sets a function provider having the highest priority as a search result. In the present example, it is assumed that the normal scan provider 411, the web OCR provider 414, and the FTP sending provider 415 are extracted as a result of the search.

Then, in step S805, the function provider management unit 420 notifies the workflow processing unit 430 of the search result for function providers.

Next, in step S806, the workflow processing unit 430, when having received the search result received in step S805, determines a workflow execution color based on information on the function providers. The workflow execution color refers to information indicating what color is used a base color employed for a design with which a GUI is displayed during execution of the workflow (information on a design about a user interface), and is specified in common for extension programs that execute the respective processes of the workflow.

Figure 9:
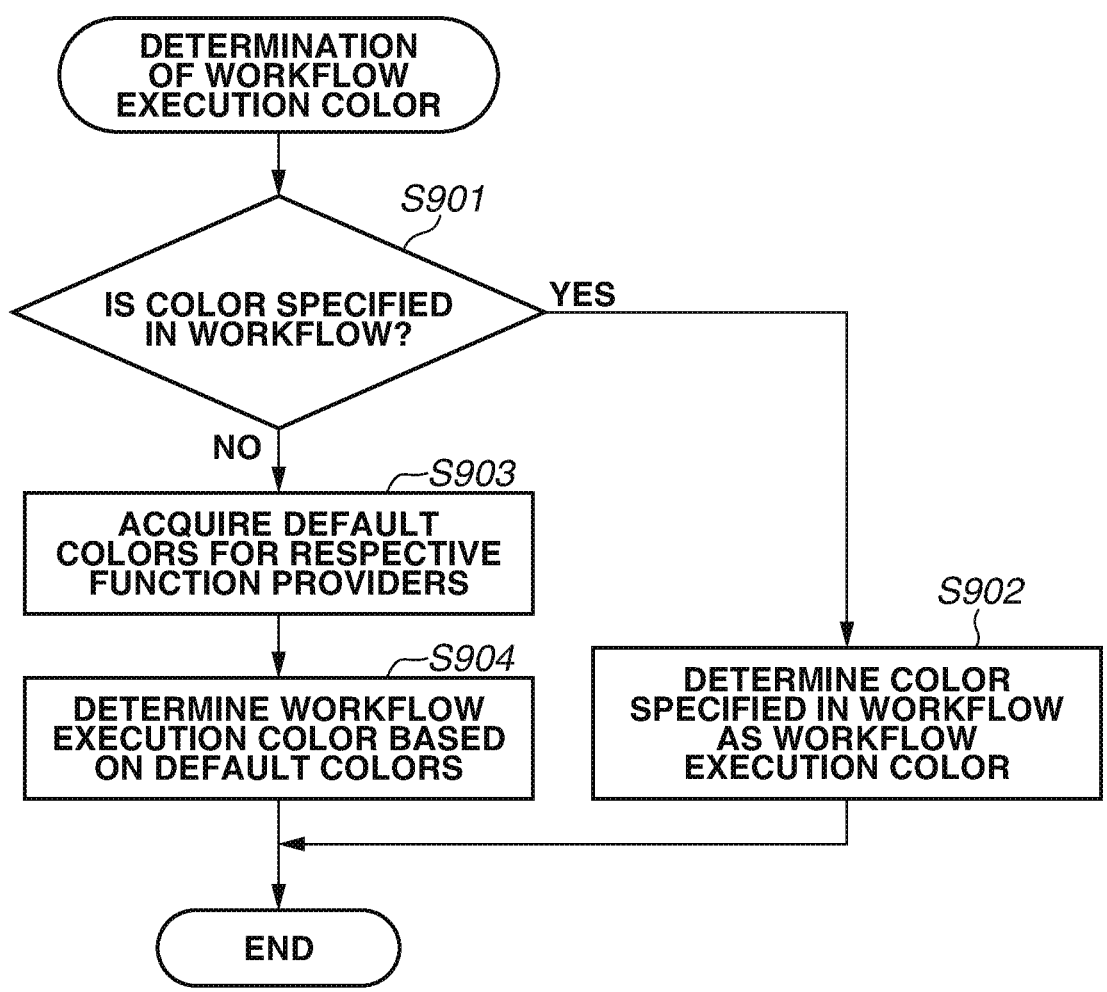
FIG. 9 is a flowchart illustrating an example of processing for determining a workflow execution color according to the exemplary embodiment.

FIG. 9 is a flowchart illustrating processing for determining a workflow execution color, which is performed by the workflow processing unit 430 in step S806 illustrated in FIG. 8.

In step S901, the workflow processing unit 430 analyzes the workflow definition file and determines whether a workflow execution color is previously specified. In the case of the workflow definition file 440 illustrated in FIG. 6, since the attribute "color" of the Workflow tag 601 has a definition of "color="Blue"", the workflow processing unit 430 determines that a workflow execution color is previously specified. In the case of the workflow definition file 441 illustrated in FIG. 7, since the Workflow tag 701 has no attribute "color", the workflow processing unit 430 determines that no workflow execution color is previously specified.

If, in step S901, the workflow processing unit 430 determines that a workflow execution color is previously specified (YES in step S901), the processing proceeds to step S902.

In step S902, the workflow processing unit 430 directly determines, as a workflow execution color, the workflow execution color specified in the workflow definition file, and the processing in the present flowchart then ends.

On the other hand, if, in step S901, the workflow processing unit 430 determines that no workflow execution color is previously specified (NO in step S901), the processing proceeds to step S903.

In step S903, the workflow processing unit 430 acquires, from the function provider information table 423, default colors for the respective function providers searched for to be executed in the workflow.

Then, in step S904, the workflow processing unit 430 determines a workflow execution color from the default colors for the respective function providers acquired in step S903 based on a predetermined method (algorithm), and the processing in the present flowchart then ends.

In the above step S904, it is assumed that the method used for determining a workflow execution color is, for example, a method of selecting a color which is largest in number among the default colors for the respective function providers. More specifically, for example, suppose that the easy scan provider 412, the embedded OCR provider 413, and the FTP sending provider 415 have been extracted during execution of the workflow definition file 441 illustrated in FIG. 7. In that case, the workflow processing unit 430 selects "Gray", which is largest in number, from among the "Blue", "Gray", and "Gray", which are default colors for the respective function providers. Alternatively, a method of using a default color for a function provider that is to be first or last executed can be employed. Furthermore, a method of using a workflow execution color that was used in the processing executed just before the present workflow can be employed. Moreover, a plurality of methods can be prepared in advance and the workflow definition file can have a description of which method is to be used. Additionally, the workflow processing unit 430 can previously set individual methods for the respective users and a method of using a workflow execution color set for the login user can be employed. Furthermore, during execution of the workflow, options of designs can be presented to the user and the user can be allowed to select a desired option. Thus, any method can be employed as long as it enables selecting a workflow execution color that makes GUI designs (in the present exemplary embodiment, colors) match the respective function providers to be executed in the workflow.

Furthermore, in the above-described exemplary embodiment, if, in step S901, it is determined that no workflow execution color is previously specified, a workflow execution color is determined according to a method such as the above-mentioned ones. However, the processing in step S901 can be skipped and a workflow execution color can be determined according to a method such as the above-mentioned ones.

Thus far is the processing for determining a workflow execution color, which is performed by the workflow processing unit 430. Since such determination processing is performed during execution of a workflow, the user is allowed to change the design for each workflow to be executed.

Moreover, in the above-described exemplary embodiment, the workflow processing unit 430 determines the design of a user interface for function providers that execute respective processes of the workflow. However, the present exemplary embodiment is not limited to such a configuration, but can be configured to make designs of user interfaces specifically tailored for function providers that execute respective processes of the workflow. For example, each function provider that executes an associated process of the workflow can acquire a design used by a function provider executed immediately before and can display a user interface of the function provider itself with the acquired design.

Then, the description refers back to FIG. 8.

Subsequent to processing in step S806, then in step S807, the workflow processing unit 430 sends a scan instruction to the normal scan provider 411, which corresponds to the search result. When sending the scan instruction, the workflow processing unit 430 passes, to the normal scan provider 411, the workflow execution color determined in step S806 as execution color information.

In step S808, the normal scan provider 411, which has received the scan instruction from the workflow processing unit 430, performs scanning according to the scan instruction. On this occasion, the normal scan provider 411 performs GUI display in colors with the workflow execution color specified in step S807 (determined in step S806) used as a base color with respect to a GUI to be displayed during execution of scanning. Furthermore, the normal scan provider 411 internally retains, as a table, information indicating what colors are to be used to display respective GUI parts in association with colors able to be previously specified as a base color, and performs displaying according to the table.

Then, after the execution of scanning by the normal scan provider 411 in step S808 is completed, the workflow processing unit 430 performs processing in step S809.

In step S809, the workflow processing unit 430 sends an OCR instruction to the web OCR provider 414, which corresponds to the search result. As in the processing in step S807, when sending the OCR instruction, the workflow processing unit 430 passes, to the web OCR provider 414, the workflow execution color determined in step S806 as execution color information.

In step S810, the web OCR provider 414, which has received the OCR instruction from the workflow processing unit 430, performs OCR according to the OCR instruction.

As an example of processing performed by a function provider that performs processing using the web browser 450, OCR processing performed by the web OCR provider 414 is described below.

FIG. 10 is a flowchart illustrating an example of OCR processing performed by the web OCR provider 414 in step S810 illustrated in FIG. 8.

In step S1001, the web OCR provider 414 activates the web browser 450.

In step S1002, the web OCR provider 414 notifies the web browser 450 of a Uniform Resource Locator (URL) used to invoke a web application on the server 102, which performs OCR. As a result, the web browser 450 receives, from the server 102, content, including HyperText Markup Language (HTML) data, script, and image data, to be displayed on the web browser 450. This content is used to inform the user that OCR is in progress.

Then, in step S1003, the web browser 450 performs rendering on the content received in step S1002, executes the script, and displays the content.

Then, in step S1004, the web OCR provider 414 performs processing for setting a workflow execution color on the content that is being displayed by the web browser 450. More specifically, the web OCR provider 414 causes the web browser 450 to execute a script for changing colors. That script includes processing for converting the setting of colors included in the content into colors associated with a base color indicated by the workflow execution color passed from the workflow processing unit 430 as execution color information in step S809 illustrated in FIG. 8. For example, if the base color passed from the workflow processing unit 430 as execution color information is "Blue", the script includes processing for bring the hue of an original color (default color) of the content close to "Blue" without changing the brightness and saturation thereof. In this way, even a function provider that performs display using a web browser, such as the web OCR provider 414, is able to specify a workflow execution color. Furthermore, the above-mentioned script is, for example, a Java™ Script. Moreover, the method for setting a workflow execution color is not limited to the above-described method, but can be another method, for example, a method of using a style sheet.

Then, in step S1005, the web OCR provider 414 transmits an image output from the normal scan provider 411 and received from the workflow processing unit 430 to the server 102 via the web browser 450. The server 102 performs OCR processing on the received image and then sends, as a response, an OCR result to the web browser 450.

Then, in step S1006, the web browser 450 acquires the OCR result from the server 102, and the web OCR provider 414 acquires the OCR result acquired by the web browser 450 and then passes the acquired OCR result to the workflow processing unit 430.

Thus far is the OCR processing performed by the web OCR provider 414. Although, here, the OCR processing performed by the web OCR provider 414 has been described as an example of processing by a function provider that performs processing using the web browser 450, workflow execution processing can also be similarly set even in a case where processing other than OCR processing (for example, data transmission processing to a file server, image processing, and posting processing to a social networking service) is performed as long as the processing is performed using the web browser 450.

Then, the description refers back to FIG. 8.

In step S811, the workflow processing unit 430 sends an FTP sending instruction for the scanned image and the OCR result to the FTP sending provider 415, which corresponds to the search result. As in the processing in step S807, when sending the FTP sending instruction, the workflow processing unit 430 passes, to the FTP sending provider 415, the workflow execution color determined in step S806 as execution color information.

In step S812, the FTP sending provider 415, which has received the FTP sending instruction from the workflow processing unit 430, performs FTP sending according to the FTP sending instruction. On this occasion, the FTP sending provider 415 performs GUI display in colors with the workflow execution color specified in step S811 (determined in step S806) used as a base color with respect to a GUI to be displayed during execution of FTP sending.

With the above-described procedure, in a case where a plurality of function providers is combined to be executed as a series of processing operations, GUI designs of the respective function providers to be executed in the series of processing operations are determined according to a workflow definition, so that the GUI designs can be standardized in a workflow. As used herein the term "standardized" refers to making the GUI designs match certain general requirements in terms of size, font, etc., while providing the required functionality in the series of processing operations. For example, since the workflow execution color varies with different workflow definitions according to the flowchart of FIG. 9, the GUI design is allowed to change for each workflow.

Moreover, although, in the present exemplary embodiment, an example has been described in which designs of GUIs are made to be uniform through a workflow with respect to colors used as a base color, other design elements can also be made uniform from a viewpoint of standardizing designs (display forms). For example, shapes (for example, round corner and shaded) of components (for example, button and text box) used in GUIs, layouts of the components, and font types or languages of character fonts used in GUIs can be made uniform. Additionally, design elements can be combined to be expressed as a GUI design theme, and the GUI design theme can be made uniform for the respective function providers to be executed in the workflow.

Furthermore, although, in the present exemplary embodiment, a configuration for a workflow has been described in which a workflow processing unit invokes function providers, an application serving as extension software can function as a workflow processing unit, which invokes other pieces of extension software. For example, in a case where an arbitrary application performs processing, when invoking another application or function provider in the middle of the processing, the arbitrary application can retain the definition of a design for each processing and, at the time of invocation, can pass the specified design to the extension software to be invoked.

Moreover, in a case where a plurality of applications is combined to perform a series of processing operations, GUI designs of the respective applications can be made uniform in a similar way to that in the above-described case of function providers.

Furthermore, although, in the present exemplary embodiment, an information processing apparatus according to an exemplary embodiment has been described using an MFP, the apparatus to which the present invention can be applied is not limited to such an MFP, but can be another type of information processing apparatus. The present invention can be applied to any apparatus which allows a function provider, which is extension software having an interface determined for each type of function, to be added thereto and which is capable of executing a workflow obtained by combining functions provided by a plurality of function providers. For example, the present invention can be applied to personal computers, tablet computers, home appliances such as television sets, and car navigation systems.

As described above, according to exemplary embodiments of the present invention, designs of user interfaces at the time of execution of a workflow are dynamically determined according to a combination of the definition of the workflow and extension software, so that, even in a case where a plurality of extension programs the designs of user interfaces of which are not similar is combined to perform a series of processing operations, the designs of user interfaces in the series of processing operations can be made uniform.

As a result, any decrease of operability that would be caused by the designs of, for example, operation screens of respective processes of a workflow not being uniform can be prevented, and an operational environment for a workflow obtained by combining easy-to-use and user-friendly extension functions can be provided.

Furthermore, in a case where information indicating not to uniform designs of GUIs is included in a workflow definition, for example, the workflow processing unit 430 can perform control to set the designs of GUIs of respective function providers that perform respective processing operations of the workflow to default designs.

Moreover, the configuration and content of the above-mentioned various pieces of data are not limiting, but can be altered and modified in various manners depending on uses and purposes.

While exemplary embodiments have been described above, the present invention can be embodied as, for example, a system, an apparatus, a method, a program, or a storage medium. Specifically, the present invention can be applied to a system composed of a plurality of devices or can be applied to an apparatus composed of a single device.

Furthermore, a configuration obtained by combining all or some of the above-described exemplary embodiments is also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-151823 filed Jul. 31, 2015, which is hereby incorporated by reference herein in its entirety.

What is claimed is:

1. An information processing apparatus comprising:
at least one processor and a memory storing instructions which, when executed by the at least one processor, cause the information processing apparatus to:
accept a workflow execution instruction for, in accordance with a workflow definition file that defines a series of processing comprising a plurality of processes, executing the series of processing by combining a plurality of programs;
acquire a workflow definition file corresponding to the execution instruction;
identify, in accordance with a workflow definition file in which a sequential order of a plurality of processing operations is defined, a plurality of programs corresponding to the plurality of processing operations;
determine whether or not information about a color is included in the workflow definition file;
in a case where it is determined that information about a color is not included in the workflow definition file, acquire pieces of information about colors set respectively for the identified plurality of programs, and, based on the acquired pieces of information about colors, decide information about a color that is to be used in common by the respective programs executing the respective processes in the series of processing;
for the plurality of processes in the workflow definition file, execute the identified plurality of programs sequentially in accordance with the sequential order defined in the workflow definition file;
in a case where information about a color is included in the workflow definition file, display a first screen corresponding to a first program included in the identified plurality of programs by using the information about a color included in the workflow definition file, and thereafter display a second screen corresponding to a second program included in the identified plurality of programs by using the information about a color included in the workflow definition file;
in a case where information about a color is not included in the workflow definition file, display a first screen corresponding to a first program included in the identified plurality of programs by using the decided information about a color, and thereafter display a second screen corresponding to a second program included in the identified plurality of programs by using the decided information about a color; and
in a case where it is determined that information about a color is not included in the workflow definition file, acquire pieces of information about colors set respectively for the identified plurality of programs, and, among the acquired pieces of information about colors, information about a color that is largest in number is decided as information about a color that is to be used in common by the respective programs executing the respective processes in the series of processing.

2. The information processing apparatus according to claim 1, wherein the information processing apparatus is an image forming apparatus.

3. The information processing apparatus according to claim 1,
in a case where it is determined that information about a color is not included in the workflow definition file, information a bout a color set for a program which is to be executed first among the identified plurality of programs is decided as information about a color that is to be used in common by the respective programs executing the respective processes in the series of processing.

4. An information processing method, comprising:
accepting a workflow execution instruction for, in accordance with a workflow definition file that defines a series of processing comprising a plurality of processes, executing the series of processing by combining a plurality of programs;
acquiring a workflow definition file corresponding to the execution instruction;
identifying, in accordance with a workflow definition file in which a sequential order of a plurality of processing operations is defined, a plurality of programs corresponding to the plurality of processing operations;

determining whether or not information about a color is included in the workflow definition file;

in response to determining that information about a color is not included in the workflow definition file, acquiring pieces of information about colors set respectively for the identified plurality of programs, and, based on the acquired pieces of information about colors, decide information about a color that is to be used in common by the respective programs executing the respective processes in the series of processing;

for the plurality of processes in the workflow definition file, executing the identified plurality of programs sequentially in accordance with the sequential order defined in the workflow definition file;

in response to a determining that information about a color is included in the workflow definition file, displaying a first screen corresponding to a first program included in the identified plurality of programs by using the information about a color included in the workflow definition file, and thereafter display a second screen corresponding to a second program included in the identified plurality of programs by using the information about a color included in the workflow definition file;

in response to a determining that information about a color is not included in the workflow definition file, displaying a first screen corresponding to a first program included in the identified plurality of programs by using the decided information about a color, and thereafter display a second screen corresponding to a second program included in the identified plurality of programs by using the decided information about a color; and in response to a determining that information about a color is not included in the workflow definition file, acquire pieces of information about colors set respectively for the identified plurality of programs, and, among the acquired pieces of information about colors, information about a color that is largest in number is decided as information about a color that is to be used in common by the respective programs executing the respective processes in the series of processing.

5. A non-transitory computer-readable storage medium storing computer-executable instructions that, when executed by a computer, cause the computer to execute the information processing method according to claim 4.

\* \* \* \* \*